(12) United States Patent
Slabaugh et al.

(10) Patent No.: US 7,961,944 B2
(45) Date of Patent: Jun. 14, 2011

(54) SYSTEM AND METHOD FOR VARIATIONAL BALL SKINNING FOR GEOMETRIC MODELING OF ORDERED BALLS

(75) Inventors: Gregory G. Slabaugh, Princeton, NJ (US); Gozde Unal, West Windsor, NJ (US); Tong Fang, Morganville, NJ (US)

(73) Assignee: Siemens Audiologische Technik GmbH, Erlangen (DE)

( * ) Notice: Subject to any disclaimer, the term of this patent is extended or adjusted under 35 U.S.C. 154(b) by 819 days.

(21) Appl. No.: 11/933,516

(22) Filed: Nov. 1, 2007

(65) Prior Publication Data
US 2008/0109192 A1    May 8, 2008

Related U.S. Application Data

(60) Provisional application No. 60/864,853, filed on Nov. 8, 2006.

(51) Int. Cl.
*G06K 9/34* (2006.01)
(52) U.S. Cl. ........ 382/173; 382/128; 382/130; 382/131; 382/154

(58) Field of Classification Search .................. 382/173, 382/128, 130, 131, 154; 361/679.21, 679.02; 310/237; 600/300; 403/171; 703/2
See application file for complete search history.

(56) References Cited

U.S. PATENT DOCUMENTS

| | | | |
|---|---|---|---|
| 7,042,714 B2 * | 5/2006 | Hillman et al. | 361/679.21 |
| 7,346,203 B2 * | 3/2008 | Turek et al. | 382/131 |

* cited by examiner

*Primary Examiner* — Anh Hong Do (57) ABSTRACT

A method for modeling a 2-dimensional tubular structure in a digitized image includes providing a digitized image of a tubular structure containing a plurality of 2D balls of differing radii, initializing a plurality of connected spline segments that form an envelope surrounding the plurality of 2D balls, each the spline segment $S_i$ being parameterized by positions of the $i^{th}$ and $i+1^{th}$ balls and contact angles $\alpha_i, \alpha_{i+1}$ from the center of each respective ball to a point on the perimeter of each the ball contacting the spline segment $S_i$, each the $\alpha_i$ affecting spline segment $S_i$ and $S_{i-1}$, and updating the angles by minimizing an energy that is a functional of the angles, where the updating is repeated until the energy is minimized subject to a constraint that the envelope is tangent to each ball at each point of contact, where the envelope is represented by the contact angles.

24 Claims, 6 Drawing Sheets

SYSTEM AND METHOD FOR VARIATIONAL BALL SKINNING FOR GEOMETRIC MODELING OF ORDERED BALLS

CROSS REFERENCE TO RELATED UNITED STATES APPLICATIONS

This application claims priority from "Variational Ball Skinning for Geometric Modeling of Tubular Structures", U.S. Provisional Application No. 60/864,853 of Slabaugh, et al., filed Nov. 8, 2006, the contents of which are herein incorporated by reference.

TECHNICAL FIELD

This disclosure is directed to computing an interpolating envelope of an ordered set of 2D balls.

DISCUSSION OF THE RELATED ART

Figure 1A:
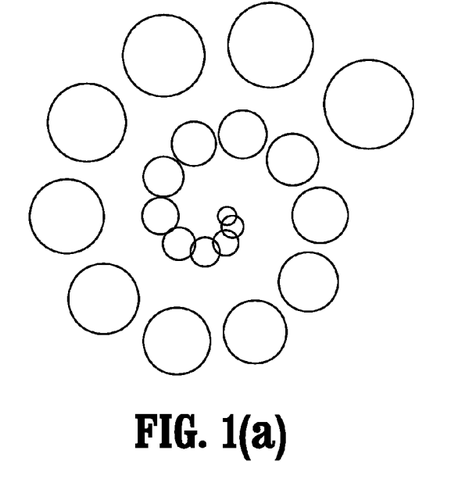
Figure 1B:
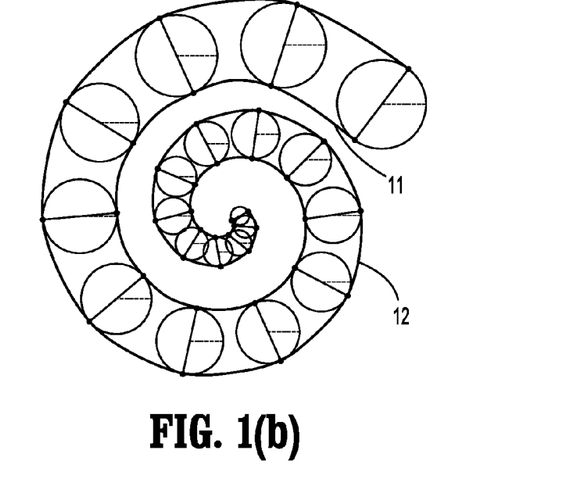

The geometric question of ball skinning is the computation of an interpolating envelope of a set of balls. An example ball skinning is shown in FIGS. 1(a)-(b). Given an ordered sequence of balls, shown in FIG. 1(a), one can produce in envelope that optimally interpolates the balls, as shown in FIG. 1(b). This envelope has two splines, an inner 11 and an outer 12 spline that are computed using differential equations. Ball skinning envelopes can be either one-sided or two-sided envelopes. A one-sided envelope is a contour that rests on one side of a collection of balls such as that portrayed in FIG. 2, while a two-sided envelope defines an interpolating region that has an inside and outside, as demonstrated in FIGS. 1(a)-(b).

Ball skinning arises in numerous applications, including character skinning, molecular surface model generation, and modeling of tubular structures. The balls can have different radii, be configured in different positions, and may or may not overlap. In one formulation of the problem, the envelopes are required to touch each ball at a point of contact, and be tangent to the ball at the point of contact, as illustrated in FIG. 1. The envelope then forms a "skin" that rests on and interpolates the underlying balls.

The question of skinning appears in various contexts. In computer graphics and animation, often an articulated object or character is constructed by forming a layered representation consisting of a skeletal structure and a corresponding geometric skin. The skeleton has fewer degrees of freedom and is simpler to adjust by an animator. Given a new skeletal pose, the skinning algorithm is responsible for deforming the geometric skin to respond to the motion of the underlying skeleton.

The question of ball skinning appears frequently in the context of chemistry and molecular biology, when generating surface meshes for molecular models. Several algorithms exist to skin a molecular model to produce a $C^1$ continuous surface that is tangent smooth and has high mesh quality. These methods are typically either based on Delaunay triangulation or by finding the isosurface of an implicit function. While the surfaces generated by these methods are tangent to the balls and have smoothness at the point of tangency, these methods do not provide an optimally smooth envelope.

One application concerns modeling the geometry of a blood vessel that has been identified using a 2D variant of a ball packing algorithm, which places numerous balls of different radii so that they fit snugly inside an imaged blood vessel. Given these balls, one would like to find a smooth, $C^1$ envelope that smoothly interpolates the balls. This surface can then be used for visualization of the blood vessel as well as measurements such as volume or surface area. For a given configuration of balls, there are an infinite number of possible solutions to this question.

SUMMARY OF THE INVENTION

Exemplary embodiments of the invention as described herein generally include methods and systems for modeling the envelope as using a angle for each ball. An exemplary envelope is a $C^1$ spline, which, by construction, touches each ball at a point of contact and be tangent to ball at the point of contact. To formulate the question so that it is well-posed, one seeks the envelope that has minimal arc length and/or curvature. This can be achieved by deriving two differential equations that minimize an energy based on this constrained variational problem, one for deforming this constrained spline to minimize its arc length, and a second for minimizing its curvature. These differential equations can then be solved to update a given spline to its optimal position. Given an initial envelope, the envelope's parameters are evolved using the differential equations until convergence occurs. This produces the envelope that has minimal length and/or curvature, touches each ball at a point of contact, and is tangent to the ball at the point of contact. In this sense, the method provides an optimal constrained interpolation of the balls. Experimental examples are presented of how these differential equations are used perform optimally generating interpolating envelopes of balls of different sizes and in various configurations.

According to an aspect of the invention, there is provided a method for modeling a 2-dimensional tubular structure in a digitized image, the method including providing a digitized image of a tubular structure, the image comprising a plurality of intensities associated with a 2 dimensional (2D) grid of voxels, the tubular structure containing a plurality of 2D balls of differing radii, initializing a plurality of connected spline segments $S_i$ that form an envelope surrounding the plurality of 2D balls, each the spline segment $S_i$ being parameterized by positions of the $i^{th}$ and $i+1^{th}$ balls and contact angles $\alpha_i$, $\alpha_{i+1}$ from the center of each respective ball to a point on the perimeter of each the ball contacting the spline segment $S_i$, each the $\alpha_i$ affecting spline segment $S_i$ and $S_{i+1}$, and updating the angles by minimizing an energy E, where E is an energy that is a functional of the angles equal to $E=(1-k)E_\alpha+kE_c$, where k is a constant, $E_\alpha$ is an arc-length term and $E_c$ is a curvature term, where the updating is repeated until the energy E is minimized subject to a constraint that the envelope is tangent to each ball at each point of contact, where the envelope is represented by the contact angles.

According to a further aspect of the invention, the angles are updated according to $\alpha^{n+1}=\alpha^n-\Delta t \nabla E_{\alpha^n}(\alpha^n)$ where $\Delta t$ is a time step, superscript n is a time step index for the angles, and $$\nabla E_{\alpha^n}(\alpha^n) = \left[\frac{\partial E}{\partial \alpha_1^n}, \ldots, \frac{\partial E}{\partial \alpha_N^n}\right]^T.$$

According to a further aspect of the invention, each spline segment is a $C^1$ cubic spline segment modeled as $S_i=A_i t^3 + B_i t^2 + C_i t + D_i$, where $t \in [0,1]$ and where each the curve satisfies the constraints $$S_i|_{t=0} = p_i,$$

$$\frac{dS_i}{dt}\bigg|_{t=0} = t_i,$$

$$S_i|_{t=1} = p_{i+1},$$

-continued $$\frac{dS_i}{dt}\bigg|_{t=1} = t_{i+1}.$$

where $p_i$ is the contact point on the ith ball $$p_i = c_i + \begin{bmatrix} r_i \cos\alpha_i \\ r_i \sin\alpha_i \end{bmatrix}$$

where $c_i$ is the center of the ball and $r_i$ is the radius, and $$t_i = \begin{bmatrix} -a_i \sin\alpha_i \\ a_i \cos\alpha_i \end{bmatrix}$$

is the starting direction of the curve, where $\alpha_i$ is a stiffness factor.

According to a further aspect of the invention, each $\alpha_i$ is fixed to be half the distance between the next and previous ball centers, and where for the first and last balls, the $\alpha_i$ is fixed to the distance between the ball center and its neighbor ball center.

According to a further aspect of the invention, minimizing the arc-length comprises minimizing $$E_a = \sum_{i=1}^{N} \int |S_i'| dt$$

using derivatives with respect to the angles $\alpha_i$, where the prime indicates a derivative with respect to t and the sum is over all the curves, and where $$\frac{\partial E_a}{\partial \alpha_i} = \frac{\partial}{\partial \alpha_i}\left(\int |S_{i-1}'| dt\right) + \frac{\partial}{\partial \alpha_i}\left(\int |S_i'| dt\right)$$

$$= \int \langle S_{i-1}', S_{i-1}'\rangle^{-\frac{1}{2}} \left\langle S_{i-1}', \frac{\partial S_{i-1}'}{\partial \alpha_i}\right\rangle dt + \int \langle S_i', S_i'\rangle^{-\frac{1}{2}}$$

$$\left\langle S_i', \frac{\partial S_i'}{\partial \alpha_i}\right\rangle dt.$$

According to a further aspect of the invention, minimizing the curvature comprises minimizing $$E_c = \sum_{i=1}^{N} \int \kappa_i^2(t) dt \text{ where } \kappa_i = \frac{\langle S_i', JS_i''\rangle}{\langle S_i', S_i'\rangle^{\frac{3}{2}}} \text{ and } J = \begin{bmatrix} 0 & 1 \\ -1 & 0 \end{bmatrix}$$

using derivatives with respect to the angles $\alpha_i$, where the primes indicate derivatives with respect to t and the sum is over all the curves, and where $$\frac{\partial E_c}{\partial \alpha_i} = \frac{\partial}{\partial \alpha_i}\left(\int \kappa_{i-1}^2(t) dt\right) + \frac{\partial}{\partial \alpha_i}\left(\int \kappa_i^2(t) dt\right) =$$

$$\frac{\partial}{\partial \alpha_i}\left(\int \left[\frac{\langle S_{i-1}', JS_{i-1}''\rangle}{\langle S_{i-1}', S_{i-1}'\rangle^{\frac{3}{2}}}\right]^2 dt\right) + \frac{\partial}{\partial \alpha_i}\left(\int \left[\frac{\langle S_i', JS_i''\rangle}{\langle S_i', S_i'\rangle^{\frac{3}{2}}}\right]^2 dt\right) =$$

-continued $$\int 2\left[\frac{\langle S_{i-1}', JS_{i-1}''\rangle}{\langle S_{i-1}', S_{i-1}'\rangle^{\frac{3}{2}}}\right]\left(\frac{\left\langle\frac{\partial S_{i-1}'}{\partial \alpha_i}, JS_{i-1}''\right\rangle + \left\langle S_{i-1}', J\frac{\partial S_{i-1}''}{\partial \alpha_i}\right\rangle}{\langle S_{i-1}', S_{i-1}'\rangle^{\frac{3}{2}}} -$$

$$\frac{3}{2}\frac{\langle S_{i-1}', JS_{i-1}''\rangle 2\left\langle S_{i-1}', \frac{\partial S_{i-1}'}{\partial \alpha_i}\right\rangle}{\langle S_{i-1}', S_{i-1}'\rangle^{\frac{5}{2}}}\right) dt + \int 2\left[\frac{\langle S_i', JS_i''\rangle}{\langle S_i', S_i'\rangle^{\frac{3}{2}}}\right]$$

$$\left(\frac{\left\langle\frac{\partial S_i'}{\partial \alpha_i}, JS_i''\right\rangle + \left\langle S_i', J\frac{\partial S_i''}{\partial \alpha_i}\right\rangle}{\langle S_i', S_i'\rangle^{\frac{3}{2}}} - \frac{3}{2}\frac{\langle S_i', JS_i''\rangle 2\left\langle S_i', \frac{\partial S_i'}{\partial \alpha_i}\right\rangle}{\langle S_i', S_i'\rangle^{\frac{5}{2}}}\right) dt.$$

According to a further aspect of the invention, coefficients $A_i$, $B_i$, $C_i$, $D_i$ are defined as $$A_i = -2p_{i+1} + 2p_i + t_i + t_{i+1}$$

$$B_i = 3p_{i+1} - 3p_i - 2t_i - t_{i+1},$$

$$C_i = t_i$$

$$D_i = p_i$$

and where $$\frac{\partial S_i'}{\partial \alpha_i} = 3t^2\frac{\partial A_i}{\partial \alpha_i} + 2t\frac{\partial B_i}{\partial \alpha_i} + \frac{\partial C_i}{\partial \alpha_i}, \quad \frac{\partial S_{i-1}'}{\partial \alpha_i} = 3t^2\frac{\partial A_{i-1}}{\partial \alpha_i} + 2t\frac{\partial B_{i-1}}{\partial \alpha_i} + \frac{\partial C_{i-1}}{\partial \alpha_i},$$

$$\frac{\partial S_i''}{\partial \alpha_i} = 6t\frac{\partial A_i}{\partial \alpha_i} + 2\frac{\partial B_i}{\partial \alpha_i}, \quad \frac{\partial S_{i-1}''}{\partial \alpha_i} = 6t\frac{\partial A_{i-1}}{\partial \alpha_i} + 2\frac{\partial B_{i-1}}{\partial \alpha_i},$$

$$\frac{\partial A_i}{\partial \alpha_i} = 2\frac{\partial p_i}{\partial \alpha_i} + \frac{\partial t_i}{\partial \alpha_i}, \quad \frac{\partial A_{i-1}}{\partial \alpha_i} = -2\frac{\partial p_i}{\partial \alpha_i} + \frac{\partial t_i}{\partial \alpha_i},$$

$$\frac{\partial B_i}{\partial \alpha_i} = -3\frac{\partial p_i}{\partial \alpha_i} - 2\frac{\partial t_i}{\partial \alpha_i}, \quad \frac{\partial B_{i-1}}{\partial \alpha_i} = 3\frac{\partial p_i}{\partial \alpha_i} - \frac{\partial t_i}{\partial \alpha_i},$$

$$\frac{\partial C_i}{\partial \alpha_i} = \frac{\partial t_i}{\partial \alpha_i}, \quad \frac{\partial C_{i-1}}{\partial \alpha_i} = 0.$$

According to a further aspect of the invention, the energy E is minimized subject to a further constraint of one of that the envelope has a minimal arc-length, the envelope has a minimal curvature, or the envelope has a minimal arc-length and curvature.

According to a further aspect of the invention, the spline segments are initialized by choosing an angle $\alpha_i$ for each ball i that matches a ray orthogonal to a centerline connecting adjacent ball center points.

According to a further aspect of the invention, the method includes initializing a plurality of connected spline segments $S_i$ that interpolate an inner boundary of the plurality of 2D balls, each the spline segment $S_i$ being parameterized by positions of the $i^{th}$ and $i+1^{th}$ balls and contact angles $\alpha_i$, $\alpha_{i+1}$ from the center of each respective ball to a point on the perimeter of each the ball contacting the spline segment $S_i$, each the $\alpha_i$ affecting spline segment $S_i$ and $S_{i-1}$, and updating the angles by minimizing an energy E, where E is an energy that is a functional of the angles equal to $E=(1-k)E_a+kE_c$, where k is a constant, $E_a$ is an arc-length term and $E_c$ is a curvature term, where the updating is repeated until the energy E is minimized subject to a constraint that the inner boundary is tangent to each ball at each point of contact, where the inner boundary is represented by the contact angles.

According to a further aspect of the invention, the tubular structure represents a blood vessel.

According to another aspect of the invention, there is provided a program storage device readable by a computer, tangibly embodying a program of instructions executable by the computer to perform the method steps for modeling a 2-dimensional tubular structure in a digitized image.

BRIEF DESCRIPTION OF THE DRAWINGS

FIGS. 1(*a*)-(*b*) illustrate an example of a two sided ball skinning, according to an embodiment of the invention.

FIGS. 4(*a*)-(*c*) depict a simple example of ball skinning, according to an embodiment of the invention.

FIGS. 5(*a*)-(*c*) depict the skinning of another set of balls, according to an embodiment of the invention.

FIGS. 6(*a*)-(*c*) show an example of generating an interpolating region for a collection of balls, according to an embodiment of the invention.

FIGS. 7(*a*)-(*c*) illustrate ball skinning for balls arranged on a sine wave and having a variable radius, according to an embodiment of the invention.

DETAILED DESCRIPTION OF EXEMPLARY EMBODIMENTS

Exemplary embodiments of the invention as described herein generally include systems and methods for computing an interpolating envelope of an ordered set of 2D halls. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^2$ to R, the methods of the inventions are not limited to such images. For a 2-dimensional image, the domain of the image is typically a 2-dimensional rectangular array, wherein each pixel or voxel can be addressed with reference to a set of 2 mutually orthogonal axes. The terms "digital" and "digitized" as used herein will refer to images or volumes, as appropriate, in a digital or digitized format acquired via a digital acquisition system or via conversion from an analog image.

Figure 2:
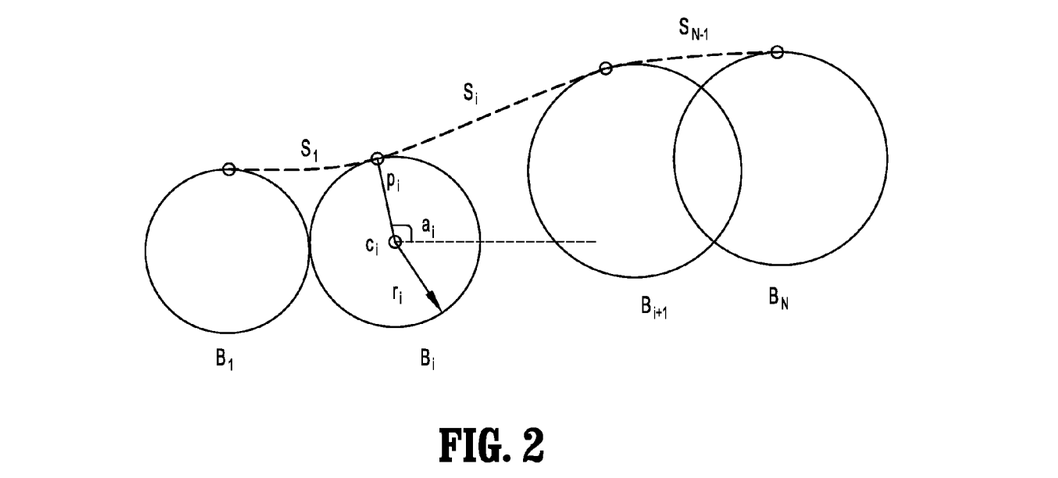
FIG. 2 illustrates the goal of ball skinning, which is finding an envelope that interpolates the ordered set of balls.

FIG. 2 illustrates the goal of a ball skinning method according to an embodiment of the invention, which is computing an interpolating envelope of an ordered set of 2D balls. Each spline $S_i$ is tangent to ball $B_i$ at point $p_i$ where the tangent is orthogonal to a ray extended from the centerpount $c_i$ where the ray makes an angle $\alpha_i$ with a horizontal. It is desired to find an envelope S that satisfies several geometric criteria:

1. The envelope should be modeled by a point of contact with a ball.
2. The envelope should be tangent to a ball at the point of contact.
3. The envelope should minimize a functional composed of terms based on arc length and curvature.

An envelope according to an embodiment of the invention can be represented using the contact angle of each ball within the envelope.

FIG. 2 depicts a desirable envelope as a dotted line, which is a $C^1$ curve passing through the point of contact on each ball, where at each contact point, the envelope is tangent to the ball. A $C^1$ curve is a continuous curve with continuous first derivatives. The envelope S is composed of a set of envelope segments, $S_i$, for i=1, . . . , N, where N is the total number of segments.

Segments

Figure 3:
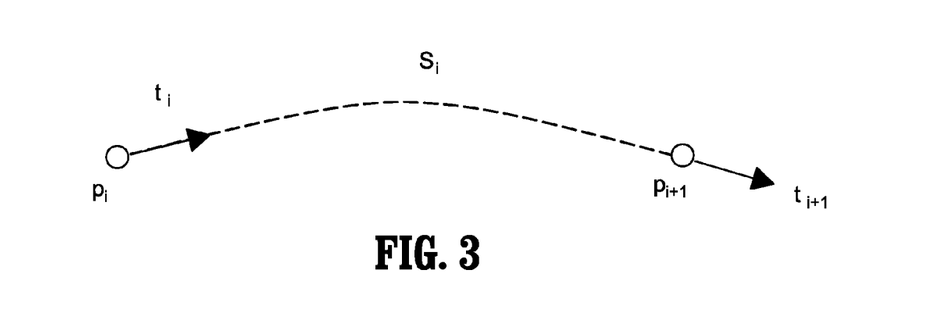
FIG. 3 depicts a segment of an envelope, according to an embodiment of the invention.

FIG. 3 depicts a segment of an envelope. As shown in FIG. 3, one can choose to model each segment $S_i$ using a spline that starts at point $p_i$ in direction $t_i$, and ends at point $p_{i+1}$ in direction $t_{i+1}$. The segment can be modeled using a cubic polynomial curve $$S_i = A_i t^3 + B_i t^2 + C_i t + D_i, \quad (1)$$

since the four constraints require four degrees of freedom. For the $i^{th}$ segment, $A_i$, $B_i$, $C_i$, and $D_i$ are coefficients, and $t \in [0,1]$ is a time variable that parameterizes the curve.

To determine the coefficients for a segment, the following constraints should be satisfied:

$$S_i |_{t=0} = p_i,$$

$$\frac{dS_i}{dt}\bigg|_{t=0} = t_i,$$

$$S_i |_{t=1} = p_{i+1},$$

$$\frac{dS_i}{dt}\bigg|_{t=1} = t_{i+1}.$$

With these constraints, and the derivative of the segment, $$\frac{dS_i}{dt} = 3A_i t^2 + 2B_i t + C_i \quad (2)$$

one can obtain a system of four equations for the four coefficients:

$$D_i = p_i,$$

$$C_i = t_i,$$

$$A_i + B_i + C_i + D_i = p_{i+1},$$

$$3A_i + 2B_i + C_i = t_{i+1},$$

which can be solved, yielding:

$$A_i = -2p_{i+1} + 2p_i + t_i + t_{i+1}$$

$$B_i = 3p_{i+1} - 3p_i - 2t_i - t_{i+1}$$

$$C_i = t_i$$

$$D_i = p_i$$

Endpoints

Now that there is a way to model each segment of the envelope, one can determine the endpoints $p_i$, $p_{i+1}$ and their respective tangents, $t_i$, $t_{i+1}$ of each segment. As shown in FIG. 2, the point of contact $p_i$ on the $i^{th}$ ball can be represented as $$p_i = c_i + \begin{bmatrix} r_i \cos\alpha_i \\ r_i \sin\alpha_i \end{bmatrix}, \quad (4)$$

where $r_i$ is the radius of a ball, $c_i$ is its center, and $\alpha_i$ is an angle. In addition, the tangent can be represented as $$t_i = \begin{bmatrix} -a_i \sin\alpha_i \\ a_i \cos\alpha_i \end{bmatrix}, \quad (5)$$

where $\alpha_i$ is a stiffness term that controls the influence of the tangential constraint. Each $\alpha_i$ can be fixed to be half the distance between the next and previous ball centers (for the first and last balls, it is the distance between the ball center and its neighbor ball center). Note that both the point $p_i$ and the tangent $t_i$ are only a function of the angle $\alpha_i$, since the radius of the ball is fixed.

There is now a way to represent the envelope S as a set of segments $S_i$, where each segment $S_i$ interpolates between the points of contact $p_i$, $p_{i+1}$ with balls $B_i$, $B_{i+1}$, subject to tangent conditions $t_i$, $t_{i+1}$ respectively.

By construction of the problem, the angle $\alpha_i$ affects only the segment $S_i$ as well as the segment $S_{i-1}$, as can be easily seen in FIG. 2. Finally, the envelope is fully parameterized by the balls and the spline angles $\alpha_i$. Since the balls are fixed, the objective will be to compute the angles $\alpha_i$ that form the optimal envelope.

Energy Minimization

There are an infinite number of envelopes that are modeled by a contact point on each ball and have a direction tangent to the ball at the point of contact. To further constrain the problem, the envelope can be required to have minimal arc length and/or be smooth. This can be achieved by finding the angles $\alpha_i$ that optimize an energy functional. First, equations are derived to compute the envelope with minimal arc length, then curvature is considered.

Arc Length Minimization

Minimization of the arc length results in the shortest envelope that satisfies the geometric constraints imposed by the ball representation. That is, it is desired to find angles $\alpha_i$ that minimize $$E_\alpha = \int |S'| dt,$$

where S' is the derivative of S with respect to t. Since the envelope is represented as a set of segments, this is equivalent to $$E_a = \sum_{i=1}^{N} \int |S_i'| dt.$$

Next, the derivative of the energy is taken with respect to the angle $\alpha_i$. As stated above, the $i^{th}$ angle only affects the segments $S_{i-1}$ and $S_i$. Therefore, $$\frac{\partial E_a}{\partial \alpha_i} = \frac{\partial}{\partial \alpha_i} \left( \int |S_{i-1}'| dt \right) + \frac{\partial}{\partial \alpha_i} \left( \int |S_i'| dt \right). \quad (6)$$

Second Term

Considering the second term of EQ. (6) first, propagating the derivative with respect to $\alpha_i$ through the integral, it is easy to show that $$\frac{\partial}{\partial \alpha_i} \left( \int |S_i'| dt \right) = \int \frac{\partial}{\partial \alpha_i} \langle S_i', S_i' \rangle^{\frac{1}{2}} dt = \int \langle S_i', S_i' \rangle^{-\frac{1}{2}} \left\langle S_i', \frac{\partial S_i'}{\partial \alpha_i} \right\rangle dt,$$

where $\langle \rangle$ denotes an inner product. Next, an expression for the $$\frac{\partial S_i'}{\partial \alpha_i}$$

terms can be derived using EQ. 2, yielding $$\frac{\partial S_i'}{\partial \alpha_i} = 3t^2 \frac{\partial A_i}{\partial \alpha_i} + 2t \frac{\partial B_i}{\partial \alpha_i} + \frac{\partial C_i}{\partial \alpha_i}.$$

The derivatives $$\frac{\partial A_i}{\partial \alpha_i}, \frac{\partial B_i}{\partial \alpha_i}, \text{ and } \frac{\partial C_i}{\partial \alpha_i}$$

can be derived using EQ. 3, as $$\begin{aligned} \frac{\partial A_i}{\partial \alpha_i} &= 2\frac{\partial p_i}{\partial \alpha_i} + \frac{\partial t_i}{\partial \alpha_i} \\ \frac{\partial B_i}{\partial \alpha_i} &= -3\frac{\partial p_i}{\partial \alpha_i} - 2\frac{\partial t_i}{\partial \alpha_i} \\ \frac{\partial C_i}{\partial \alpha_i} &= \frac{\partial t_i}{\partial \alpha_i} \end{aligned} \quad (7)$$

Finally, the derivatives $$\frac{\partial p_i}{\partial \alpha_i} \text{ and } \frac{\partial t_i}{\partial \alpha_i}$$

can be derived from EQS. 4 and 5 as $$\frac{\partial p_i}{\partial \alpha_i} = \begin{bmatrix} -r_i \sin\alpha_i \\ r_i \cos\alpha_i \end{bmatrix}$$

$$\frac{\partial t_i}{\partial \alpha_i} = \begin{bmatrix} -a_i \cos\alpha_i \\ -a_i \sin\alpha_i \end{bmatrix}$$

All the derivatives needed to compute the second term in EQ. 6 have now been derived.

First Term

Now consider the first term of EQ. 6, which has a very similar derivation. Propagating the derivative with respect to $\alpha_i$ through the integral yields $$\frac{\partial}{\partial \alpha_i}\left(\int |S'_{i-1}|dt\right) = \int \langle S'_{i-1}, S'_{i-1}\rangle^{-\frac{1}{2}}\left\langle S'_{i-1}, \frac{\partial S'_{i-1}}{\partial \alpha_i}\right\rangle dt$$

As before, an expression can be derived for the $$\frac{\partial S'_{i-1}}{\partial \alpha_i}$$

terms using EQ. 2, yielding $$\frac{\partial}{\partial \alpha_i} = 3t^2 \frac{\partial A_{i-1}}{\partial \alpha_i} + 2t \frac{\partial B_{i-1}}{\partial \alpha_i} + \frac{\partial C_{i-1}}{\partial \alpha_i}.$$

Next, the derivatives $$\frac{\partial A_{i-1}}{\partial \alpha_i}, \frac{\partial B_{i-1}}{\partial \alpha_i}, \text{ and } \frac{\partial C_{i-1}}{\partial \alpha_i}$$

can be derived using EQ. 3, as $$\frac{\partial A_{i-1}}{\partial \alpha_i} = -2\frac{\partial p_i}{\partial \alpha_i} + \frac{\partial t_i}{\partial \alpha_i}, \quad (8)$$

$$\frac{\partial B_{i-1}}{\partial \alpha_i} = 3\frac{\partial p_i}{\partial \alpha_i} - \frac{\partial t_i}{\partial \alpha_i},$$

$$\frac{\partial C_{i-1}}{\partial \alpha_i} = 0.$$

All the derivatives needed to compute the first term of EQ. 6 have been derived.

Curvature Minimization

In order to minimize the curvature, note that curvature can be positive or negative. Thus, the squared curvature is minimized by finding the angles $\alpha_i$ that minimize $$E_c = \int \kappa^2(t)dt,$$

where $\kappa(t)$ is the curvature of S at point t. Since the envelope is represented as a set of segments, this is equivalent to $$E_c = \sum_{i=1}^{N} \int \kappa_i^2(t)dt,$$

where $\kappa(t)$ is the curvature at point t along segment $S_i$. Next, the derivative of the energy is taken with respect to the angle $\alpha_i$. As stated above, the $i^{th}$ angle only affects the segments $S_{i-1}$ and $S_i$. Therefore, $$\frac{\partial E_c}{\partial \alpha_i} = \frac{\partial}{\partial \alpha_i}\left(\int \kappa_{i-1}^2(t)dt\right) + \frac{\partial}{\partial \alpha_i}\left(\int \kappa_i^2(t)dt\right). \quad (9)$$

Recall that the curvature is given by $$\kappa_i = \frac{|S'_i \times S''_i|}{|S'_i|^3},$$

which can be re-expressed as $$\kappa_i = \frac{\langle S'_i, JS''_i\rangle}{\langle S'_i, S'_i\rangle^{\frac{3}{2}}},$$

where $$J = \begin{bmatrix} 0 & 1 \\ -1 & 0 \end{bmatrix}$$

is a 90 degree rotation matrix and $\langle\ \rangle$ denotes an inner product. Using these equations, EQ. 9 becomes $$\frac{\partial E_c}{\partial \alpha_i} = \frac{\partial}{\partial \alpha_i}\left(\int \left[\frac{\langle S'_{i-1}, JS''_{i-1}\rangle}{\langle S'_{i-1}, S'_{i-1}\rangle^{\frac{3}{2}}}\right]^2 dt\right) + \frac{\partial}{\partial \alpha_i}\left(\int \left[\frac{\langle S'_i, JS''_i\rangle}{\langle S'_i, S'_i\rangle^{\frac{3}{2}}}\right]^2 dt\right). \quad (10)$$

Second Term

To derive the second term of EQ. 10, the derivative with respect to $\alpha_i$ is propagated through the integral to obtain $$\frac{\partial}{\partial \alpha_i}\left(\int \left[\frac{\langle S'_i, JS''_i\rangle}{\langle S'_i, S'_i\rangle^{\frac{3}{2}}}\right]^2 dt\right) =$$

$$\int 2\left[\frac{\langle S'_i, JS''_i\rangle}{\langle S'_i, S'_i\rangle^{\frac{3}{2}}}\right]\left(\frac{\frac{\partial}{\partial \alpha_i}\langle S'_i, JS''_i\rangle}{\langle S'_i, S'_i\rangle^{\frac{3}{2}}} - \frac{3}{2}\frac{\langle S'_i, JS''_i\rangle \frac{\partial}{\partial \alpha_i}\langle S'_i, S'_i\rangle}{\langle S'_i, S'_i\rangle^{\frac{5}{2}}}\right)dt.$$

For this, one needs the derivatives $$\frac{\partial}{\partial \alpha_i}\langle S'_i, JS''_i\rangle \text{ and } \frac{\partial}{\partial \alpha_i}\langle S'_i, S'_i\rangle.$$

These derivatives can be shown to be $$\frac{\partial}{\partial \alpha_i}\langle S'_i, JS''_i\rangle = \left\langle\frac{\partial S'_i}{\partial \alpha_i}, JS''_i\right\rangle + \left\langle S'_i, J\frac{\partial S''_i}{\partial \alpha_i}\right\rangle,$$

$$\frac{\partial}{\partial \alpha_i}\langle S'_i, S'_i\rangle = 2\left\langle S'_i, \frac{\partial S'_i}{\partial \alpha_i}\right\rangle.$$

Next, derive an expression for the $$\frac{\partial S'_i}{\partial \alpha_i}$$

and $$\frac{\partial S''_i}{\partial \alpha_i}$$

terms using EQ. 2, yielding $$\frac{\partial S'_i}{\partial \alpha_i} = 3t^2 \frac{\partial A_i}{\partial \alpha_i} + 2t \frac{\partial B_i}{\partial \alpha_i} + \frac{\partial C_i}{\partial \alpha_i},$$

$$\frac{\partial S''_i}{\partial \alpha_i} = 6t \frac{\partial A_i}{\partial \alpha_i} + 2 \frac{\partial B_i}{\partial \alpha_i}.$$

The derivatives $$\frac{\partial A_i}{\partial \alpha_i}, \frac{\partial B_i}{\partial \alpha_i}, \text{ and } \frac{\partial C_i}{\partial \alpha_i}$$

are given in EQ. 7. All the derivatives needed to compute the second term in EQ. 10 are now present.

First Term

The first term of EQ. 10 is very similar the second term derived above. Propagating the derivative with respect to $\alpha_i$ through the integral, one obtains $$\frac{\partial}{\partial \alpha_i} \left( \int \left[ \frac{\langle S'_{i-1}, JS''_{i-1} \rangle}{\langle S'_{i-1}, S'_{i-1} \rangle^{\frac{3}{2}}} \right]^2 dt \right) = \int 2 \left[ \frac{\langle S'_{i-1}, JS''_{i-1} \rangle}{\langle S'_{i-1}, S'_{i-1} \rangle^{\frac{3}{2}}} \right] \left( \frac{\frac{\partial}{\partial \alpha_i} \langle S'_{i-1}, JS''_{i-1} \rangle}{\langle S'_{i-1}, S'_{i-1} \rangle^{\frac{3}{2}}} - \frac{3}{2} \frac{\langle S'_{i-1}, JS''_{i-1} \rangle \frac{\partial}{\partial \alpha_i} \langle S'_{i-1}, S'_{i-1} \rangle}{\langle S'_{i-1}, S'_{i-1} \rangle^{\frac{5}{2}}} \right) dt.$$

For this, the derivatives $$\frac{\partial}{\partial \alpha_i} \langle S'_{i-1}, JS''_{i-1} \rangle \text{ and } \frac{\partial}{\partial \alpha_i} \langle S'_{i-1}, S'_{i-1} \rangle$$

are needed. It can be shown that these derivatives are $$\frac{\partial}{\partial \alpha_i} \langle S'_{i-1}, JS''_{i-1} \rangle = \left\langle \frac{\partial S'_{i-1}}{\partial \alpha_i}, JS''_{i-1} \right\rangle + \left\langle S'_{i-1}, J \frac{\partial S''_{i-1}}{\partial \alpha_i} \right\rangle,$$

$$\frac{\partial}{\partial \alpha_i} \langle S'_{i-1}, S'_{i-1} \rangle = 2 \left\langle S'_{i-1}, \frac{\partial S'_{i-1}}{\partial \alpha_i} \right\rangle.$$

The expressions for $$\frac{\partial S'_{i-1}}{\partial \alpha_i} \text{ and } \frac{\partial S''_{i-1}}{\partial \alpha_i}$$

are $$\frac{\partial S'_{i-1}}{\partial \alpha_i} = 3t^2 \frac{\partial A_{i-1}}{\partial \alpha_i} + 2t \frac{\partial B_{i-1}}{\partial \alpha_i} + \frac{\partial C_{i-1}}{\partial \alpha_i},$$

$$\frac{\partial S''_{i-1}}{\partial \alpha_i} = 6t \frac{\partial A_{i-1}}{\partial \alpha_i} + 2 \frac{\partial B_{i-1}}{\partial \alpha_i}.$$

The derivatives $$\frac{\partial A_{i-1}}{\partial \alpha_i}, \frac{\partial B_{i-1}}{\partial \alpha_i}, \text{ and } \frac{\partial C_{i-1}}{\partial \alpha_i}$$

are given in EQ. 8.

Thus, all the derivatives needed to compute the first term of EQ. 10 have been

Boundary Conditions

The integrals in EQ. 10 are evaluated for each angle $\alpha_i$. However, for the first ball, i=1, there is no segment $S_{i-1}$, so the first integral is skipped in EQ. 10. Likewise, for the last ball, i=N, there is no segment $S_i$, so the second integral in the equation is skipped.

Thus, the gradient of energy functionals $E_\alpha$ and $E_c$ has been derived with respect to angles, $\alpha_i$. The derivation consisted implicitly of several steps via the chain rule, as the energy is the squared curvature, which in turn is a function of the envelope, which in turn is a function of the segment constants $A_i$, $B_i$, $C_i$, $D_i$ and $A_{i-1}$, $B_{i-1}$, $C_{i-1}$, $D_{i-1}$, which in turn are functions of the angles $\alpha_i$.

Energy Minimization

The energies $E_\alpha$ and $E_c$ can be combined together, as $$E = (1-k)E_\alpha + kE_c,$$

where k is a constant used to weight the arc length minimization relative to the curvature minimization. Setting k=0 results in the arc length minimization, while setting k=1 gives the curvature minimization. Convex combinations of the two can be selected using k∈[0,1]. Therefore, the combined energy minimization is given by $$\frac{\partial E}{\partial \alpha_i} = (1-k) \frac{\partial E_\alpha}{\partial \alpha_i} + k \frac{\partial E_c}{\partial \alpha_i},$$

where $$\frac{\partial E_\alpha}{\partial \alpha_i}$$

is given in EQ. 6 and $$\frac{\partial E_c}{\partial \alpha_i}$$

is provided in EQ. 9. In all of the experiments herein disclosed, k=0.9, to encourage smoother solutions. This value of k is exemplary and non-limiting, and can take on other values in other embodiments of the invention.

Figure 8:
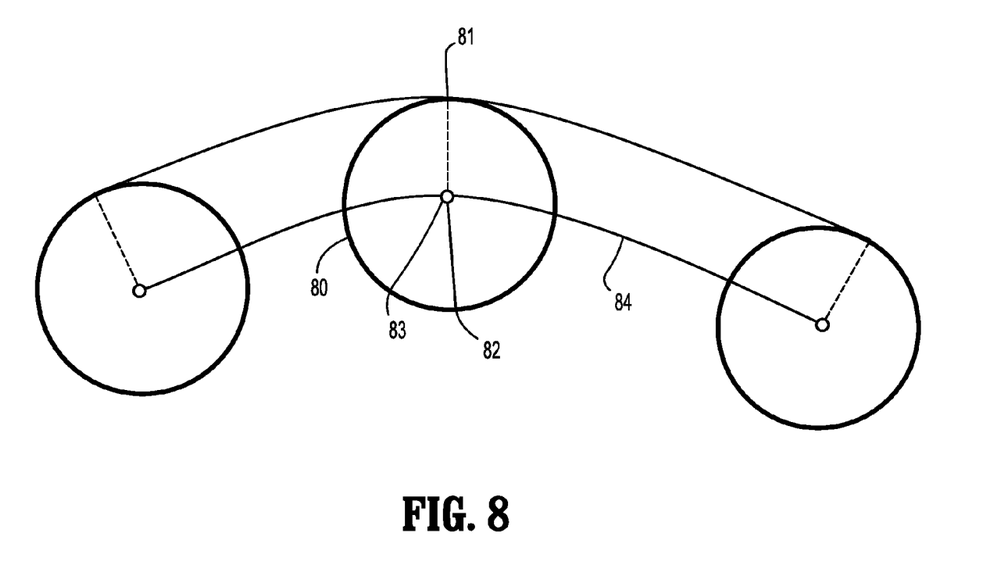
FIG. 8 illustrates an initialization of an envelope for a gradient descent minimalization of the envelope, according to an embodiment of the invention.
Figure 9:
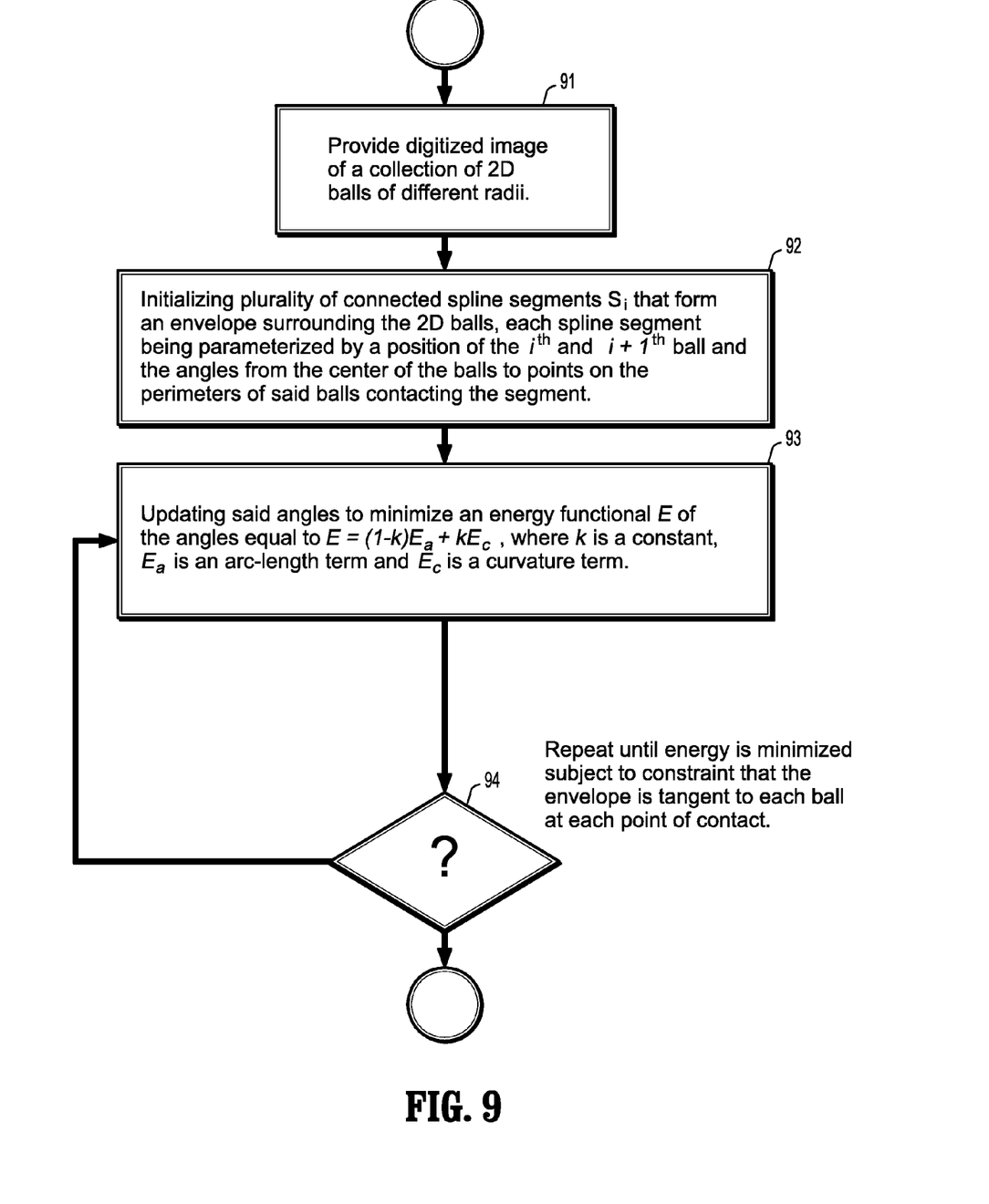
FIG. 9 is a flowchart of a method for computing an interpolating envelope of an ordered set of 2D balls, according to an embodiment of the invention.

These equations are a set of differential equations that can be used to optimize the envelope by manipulating the angles $\alpha = [\alpha_1, \ldots, \alpha_N]^T$. One exemplary, non-limiting method of optimizing the envelope is through a gradient descent procedure. A flowchart of such a method for computing an interpolating envelope of an ordered set of 2D balls is depicted in FIG. 9. A method according to an embodiment of the invention starts by providing at step 91 a digitized image of a blood vessel that has been identified using a 2D variant of a ball packing algorithm, which places numerous balls of different radii that fit snugly inside an imaged blood vessel. To start the optimization procedure, since the envelope is fully specified by the angles $\alpha_i$, one only needs to initialize an angle for each ball at step 92. According to an embodiment of the invention, one way to do this is to choose the angle $\alpha$ for each ball that matches the ray orthogonal to the centerline, as shown in FIG. 8, connecting adjacent ball center points. FIG. 8 shows ball 80 with center point 83 and rays 81 and 82 orthogonal to centerline 84. However, there are two possible angles in the figure, with respect to the rays 81 and 82. For two-sided envelopes, one would use both, while for one-sided envelopes, one would choose the angle always on the left or right side of the centerline. Then, at step 93, letting $\alpha_i^n$ be the $i^{th}$ angle at iteration n, one can then update the angles by moving them in the negative gradient direction, i.e., $$\alpha^{n+1} = \alpha^n - \Delta t \nabla E_{\alpha^n}(\alpha^n), \quad (11)$$

where $\Delta t$ is a time step and $$\nabla E_{\alpha^n}(\alpha^n) = \left[ \frac{\partial E}{\partial \alpha_1^n}, \ldots, \frac{\partial E}{\partial \alpha_N^n} \right]^T.$$

The updating of step 93 is repeated until the energy reaches a suitable minimum, at step 94. It is to be understood, however, that the disclosure of a gradient descent procedure is for expository purposes only, and is a special case of the more general formulation $$\alpha^{n+1} = \alpha^n + \Delta t \cdot f(E|\alpha^n|).$$

Other techniques can be used to minimize the energy functional in other embodiments of the invention.

The computational complexity of an algorithm according to an embodiment of the invention depends on the number of balls N+1 and the number of points L on a segment where the points and derivatives are evaluated. For each iteration of the gradient descent procedure, the computational complexity is O(NL). The number of iterations required depends on the time step $\Delta t$ as well as how close the initial envelope is to the final solution. Note that the gradient descent approach only guarantees a locally optimal solution; however, given the constraints of the problem formulation, the energy functional is rather convex.

Results

Figure 4A:
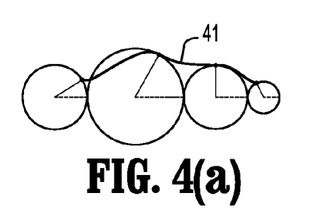
Figure 4B:
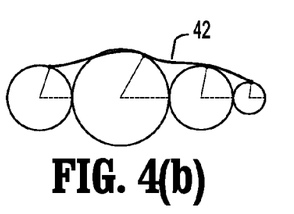
Figure 4C:
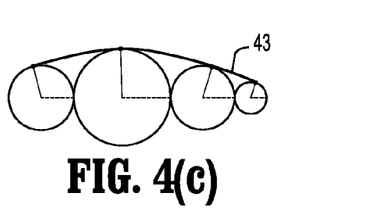

FIGS. 4(a)-(c) show a simple example ball skinning. The initial spline 41 is shown in FIG. 4(a), the result 42 after 50 iterations is shown in FIG. 4(b), and the converged result 43 after 100 iterations is shown in FIG. 4(c). Here, four balls of radius 50, 75, 50, and 25 pixels, respectively were set along the x-axis. The initial angles for this experiment were 0.57, 1.07, 1.57 and 2.07 radians, respectively; the initial envelope is shown in FIG. 4(a) of the figure. The angles were iteratively updated using EQ. 11. An intermediate solution after 50 iterations in shown in FIG. 4(b), at this stage, the envelope is considerably smoother while still satisfying the constraints of the problem. The result after 100 iterations are shown in FIG. 4(c), at which point the energy has reached a minimum and the angles have converged. The solution (all 100 iterations) is computed in 47 milliseconds using C++ code compiled on a machine with a 3.0 GHz single-core processor.

Figure 5A:
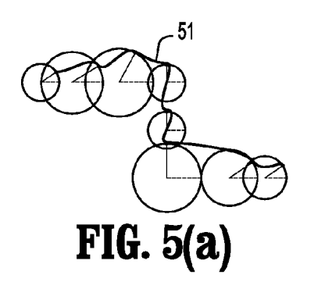
Figure 5B:
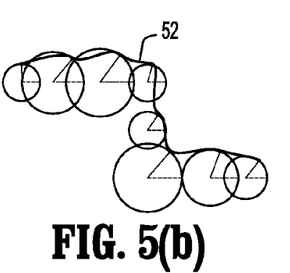
Figure 5C:
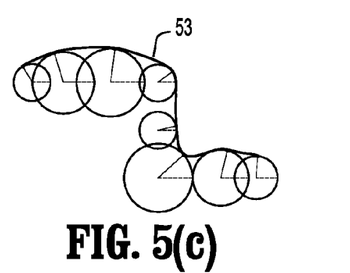

FIGS. 5(a)-(c) shows a slightly more complicated example for which some balls overlap and others do not. The initial envelope 51 is shown in FIG. 5(a), an intermediate result 52 after 70 iterations in FIG. 5(b), and the final result 53 upon convergence after 140 iterations in FIG. 5(c). The solution (all 140 iterations) is computed in 143 milliseconds.

Figure 6A:
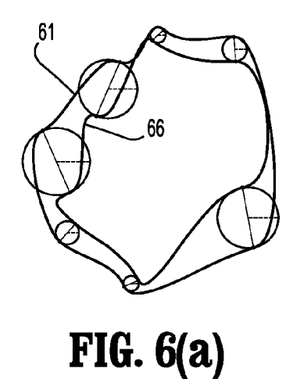
Figure 6B:
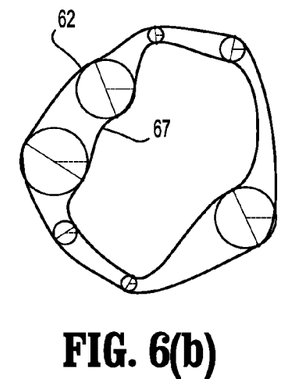
Figure 6C:
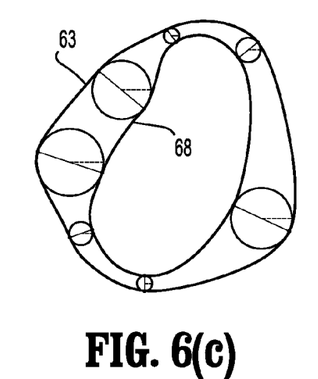

FIGS. 6(a)-(c) show an example of generating an interpolating region for a collection of balls. In this case, there are two envelopes, one defining the interior boundary of the region, and another defining the exterior boundary. For each ball, there are two points of contact: one from the interior envelope and one for the exterior envelope; however, these points of contact are constrained to be separated by 180 degrees. Therefore, for each ball there is only one angle $\alpha_i$ to be determined as in the examples above. The angle is solved for all the balls, with each envelope contributing a term in EQ. 11. FIG. 6(a) shows the initializations 61, 66, FIG. 6(b) shows intermediate results 62, 67 after 50 iterations, and FIG. 6(c) shows the final converged results 63, 68 after 100 iterations. Convergence for this example occurs in 190 milliseconds.

Figure 7A:
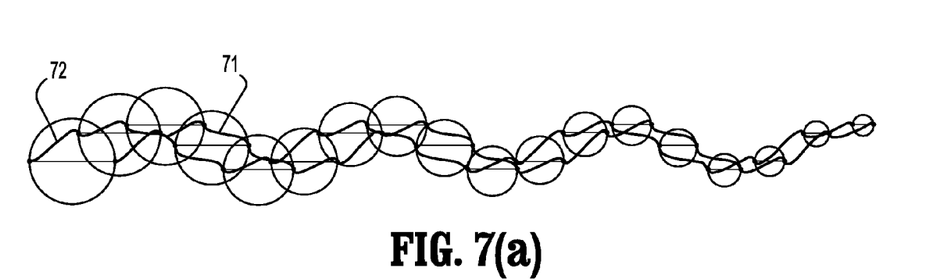
Figure 7B:
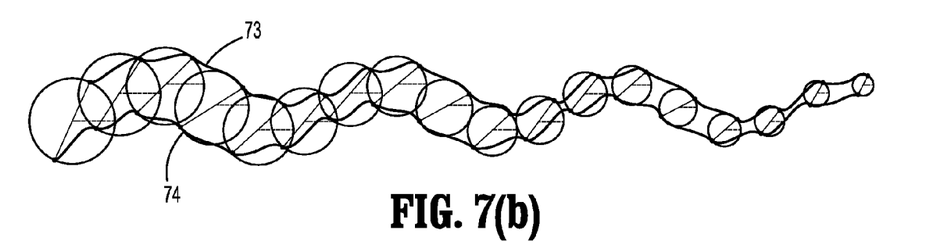
Figure 7C:
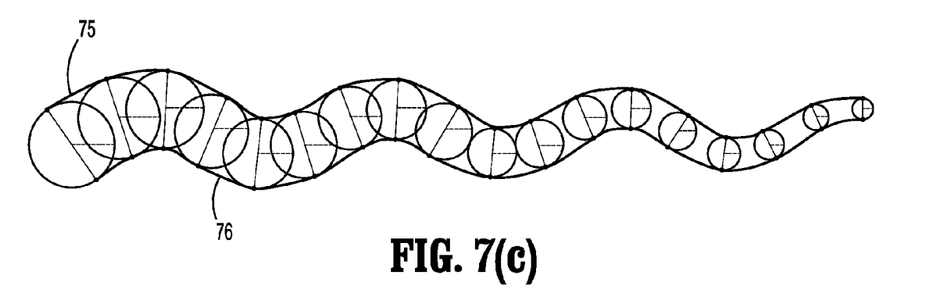

More examples are provided in FIGS. 7(a)-(c) and FIGS. 1(a)-(b). FIGS. 7(a)-(c) illustrate ball skinning for balls arranged on a sine wave and having a variable radius. The initial splines 71, 72 are shown in FIG. 7(a), the intermediate results 73, 74 are shown in FIG. 7(b), and the final converged results 75, 76 are shown in FIG. 7(c). Convergence of the skinning algorithm, starting from a set of angles far from the optimal result, takes 775 milliseconds. In FIGS. 1(a)-(b), the variable radius balls are arranged in a spiral, and FIG. 1(b) shows the converged results 11, 12. The envelopes are generated in 2.5 seconds.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 10:
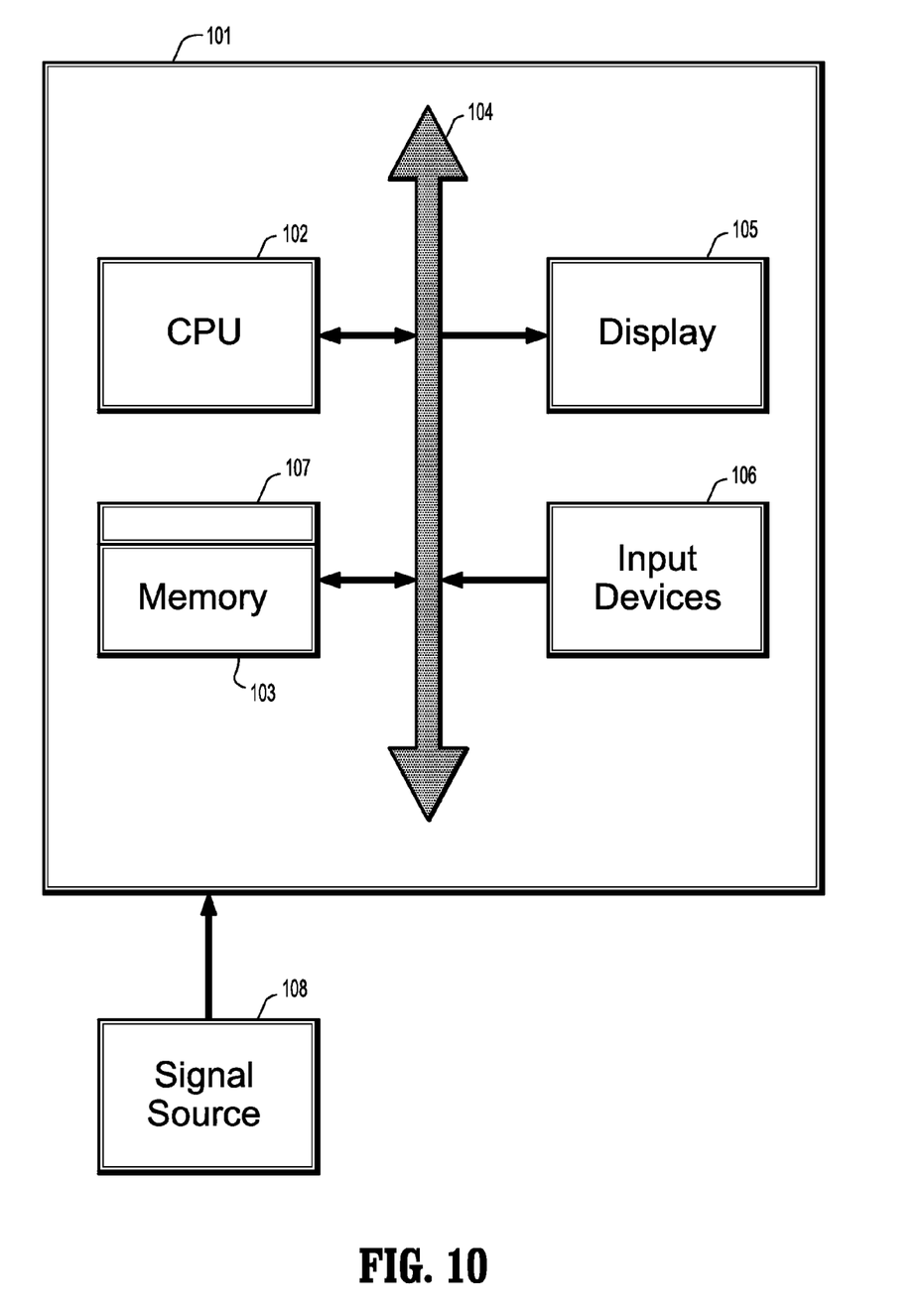
FIG. 10 is a block diagram of an exemplary computer system for implementing a method for computing an interpolating envelope of an ordered set of 2D balls, according to an embodiment of the invention.

FIG. 10 is a block diagram of an exemplary computer system for implementing a method for computing an interpolating envelope of an ordered set of 2D balls, according to an embodiment of the invention. Referring now to FIG. 10, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method for modeling a 2-dimensional tubular structure in a digitized image, the method performed by the computer comprising the steps of:

providing a digitized image of a tubular structure, said image comprising a plurality of intensities associated with a 2-dimensional (2D) grid of voxels, said tubular structure containing a plurality of 2D balls of differing radii;

initializing a plurality of connected spline segments $S_i$ that form an envelope surrounding said plurality of 2D balls, each said spline segment $S_i$ being parameterized by positions of the $i^{th}$ and $i+1^{th}$ balls and contact angles $\alpha_i, \alpha_{i+1}$ from the center of each respective ball to a point on the perimeter of each said ball contacting said spline segment $S_i$, each said $\alpha_i$ affecting spline segment $S_i$ and $S_{i-1}$; and updating said angles by minimizing an energy E, wherein E is an energy that is a functional of said angles equal to $E=(1-k)E_a+kE_c$, where k is a constant, $E_a$ is an arc-length term and $E_c$ is a curvature term, wherein said updating is repeated until said energy E is minimized subject to a constraint that said envelope is tangent to each ball at each point of contact, wherein said envelope is represented by said contact angles.

2. The method of claim 1, wherein said angles are updated according to $\alpha^{n+1}=\alpha^n-\Delta t \nabla E_{\alpha^n}(\alpha^n)$, wherein $\Delta t$ is a time step, superscript n is a time step index for the angles, and $$\nabla E_{\alpha^n}(\alpha^n) = \left[\frac{\partial E}{\partial \alpha_1^n}, \ldots, \frac{\partial E}{\partial \alpha_N^n}\right]^T.$$

3. The method of claim 1, wherein each said spline segment is a $C^1$ cubic spline segment modeled as $S_i=A_i t^3+B_i t^2+C_i t+D_i$, wherein $t \in [0,1]$ and wherein each said curve satisfies the constraints $$S_i|_{t=0} = p_i,$$

$$\frac{dS_i}{dt}\bigg|_{t=0} = t_i,$$

$$S_i|_{t=1} = p_{i+1},$$

$$\frac{dS_i}{dt}\bigg|_{t=1} = t_{i+1},$$

wherein $p_i$ is the contact point on the ith ball $$p_i = c_i + \begin{bmatrix} r_i \cos\alpha_i \\ r_i \sin\alpha_i \end{bmatrix}$$

wherein $c_i$ is the center of said ball and $r_i$ is the radius, and $$t_i = \begin{bmatrix} -a_i \sin\alpha_i \\ a_i \cos\alpha_i \end{bmatrix}$$

is the starting direction of said curve, wherein $a_i$ is a stiffness factor.

4. The method of claim 3, wherein each $a_i$ is fixed to be half the distance between the next and previous ball centers, and wherein for the first and last balls, the $a_i$ is fixed to the distance between the ball center and its neighbor ball center.

5. The method of claim 3, wherein minimizing said arc-length comprises minimizing $$E_a = \sum_{i=1}^{N} \int |S_i'| dt$$

using derivatives with respect to said angles $\alpha_i$, wherein the prime indicates a derivative with respect to t and the sum is over all said curves, and wherein $$\frac{\partial E_a}{\partial \alpha_i} = \frac{\partial}{\partial \alpha_i}\left(\int |S_{i-1}'| dt\right) + \frac{\partial}{\partial \alpha_i}\left(\int |S_i'| dt\right)$$

$$= \int \langle S_{i-1}', S_{i-1}'\rangle^{-\frac{1}{2}} \left\langle S_{i-1}', \frac{\partial S_{i-1}'}{\partial \alpha_i}\right\rangle dt + \int \langle S_i', S_i'\rangle^{-\frac{1}{2}} \left\langle S_i', \frac{\partial S_i'}{\partial \alpha_i}\right\rangle dt.$$

6. The method of claim 3, wherein minimizing said curvature comprises minimizing $$E_c = \sum_{i=1}^{N} \int \kappa_i^2(t) dt \text{ wherein } \kappa_i = \frac{\langle S_i', JS_i''\rangle}{\langle S_i', S_i'\rangle^{\frac{3}{2}}} \text{ and } J = \begin{bmatrix} 0 & 1 \\ -1 & 0 \end{bmatrix}$$

using derivatives with respect to said angles $\alpha_i$, wherein the primes indicate derivatives with respect to t and the sum is over all said curves, and wherein $$\frac{\partial E_c}{\partial \alpha_i} = \frac{\partial}{\partial \alpha_i}\left(\int \kappa_{i-1}^2(t) dt\right) + \frac{\partial}{\partial \alpha_i}\left(\int \kappa_i^2(t) dt\right) =$$

$$\frac{\partial}{\partial \alpha_i}\left(\int \left[\frac{\langle S_{i-1}', JS_{i-1}''\rangle}{\langle S_{i-1}', S_{i-1}'\rangle^{\frac{3}{2}}}\right]^2 dt\right) + \frac{\partial}{\partial \alpha_i}\left(\int \left[\frac{\langle S_i', JS_i''\rangle}{\langle S_i', S_i'\rangle^{\frac{3}{2}}}\right]^2 dt\right) =$$

$$\int 2\left[\frac{\langle S_{i-1}', JS_{i-1}''\rangle}{\langle S_{i-1}', S_{i-1}'\rangle^{\frac{3}{2}}}\right]\left(\frac{\left\langle\frac{\partial S_{i-1}'}{\partial \alpha_i}, JS_{i-1}''\right\rangle + \left\langle S_{i-1}', J\frac{\partial S_{i-1}''}{\partial \alpha_i}\right\rangle}{\langle S_{i-1}', S_{i-1}'\rangle^{\frac{3}{2}}} - \right.$$

$$\left. \frac{3}{2}\frac{\langle S_{i-1}', JS_{i-1}''\rangle 2\left\langle S_{i-1}', \frac{\partial S_{i-1}'}{\partial \alpha_i}\right\rangle}{\langle S_{i-1}', S_{i-1}'\rangle^{\frac{5}{2}}}\right) dt + \int 2\left[\frac{\langle S_i', JS_i''\rangle}{\langle S_i', S_i'\rangle^{\frac{3}{2}}}\right]$$

$$\left(\frac{\left\langle\frac{\partial S_i'}{\partial \alpha_i}, JS_i''\right\rangle + \left\langle S_i', J\frac{\partial S_i''}{\partial \alpha_i}\right\rangle}{\langle S_i', S_i'\rangle^{\frac{3}{2}}} - \frac{3}{2}\frac{\langle S_i', JS_i''\rangle 2\left\langle S_i', \frac{\partial S_i'}{\partial \alpha_i}\right\rangle}{\langle S_i', S_i'\rangle^{\frac{5}{2}}}\right) dt.$$

7. The method of claim 3, wherein coefficients $A_i, B_i, C_i, D_i$ are defined as $$A_i = -2p_{i+1} + 2p_i + t_i + t_{i+1}$$
$$B_i = 3p_{i+1} - 3p_i - 2t_i - t_{i+1}$$
$$C_i = t_i$$
$$D_i = p_i,$$

and wherein $$\frac{\partial S'_i}{\partial \alpha_i} = 3t^2 \frac{\partial A_i}{\partial \alpha_i} + 2t \frac{\partial B_i}{\partial \alpha_i} + \frac{\partial C_i}{\partial \alpha_i},$$
$$\frac{\partial S'_{i-1}}{\partial \alpha_i} = 3t^2 \frac{\partial A_{i-1}}{\partial \alpha_i} + 2t \frac{\partial B_{i-1}}{\partial \alpha_i} + \frac{\partial C_{i-1}}{\partial \alpha_i},$$
$$\frac{\partial S''_i}{\partial \alpha_i} = 6t \frac{\partial A_i}{\partial \alpha_i} + 2 \frac{\partial B_i}{\partial \alpha_i},$$
$$\frac{\partial S''_{i-1}}{\partial \alpha_i} = 6t \frac{\partial A_{i-1}}{\partial \alpha_i} + 2 \frac{\partial B_{i-1}}{\partial \alpha_i},$$
$$\frac{\partial A_i}{\partial \alpha_i} = 2 \frac{\partial p_i}{\partial \alpha_i} + \frac{\partial t_i}{\partial \alpha_i},$$
$$\frac{\partial A_{i-1}}{\partial \alpha_i} = -2 \frac{\partial p_i}{\partial \alpha_i} + \frac{\partial t_i}{\partial \alpha_i},$$
$$\frac{\partial B_i}{\partial \alpha_i} = -3 \frac{\partial p_i}{\partial \alpha_i} - 2 \frac{\partial t_i}{\partial \alpha_i},$$
$$\frac{\partial B_{i-1}}{\partial \alpha_i} = 3 \frac{\partial p_i}{\partial \alpha_i} - \frac{\partial t_i}{\partial \alpha_i},$$
$$\frac{\partial C_i}{\partial \alpha_i} = \frac{\partial t_i}{\partial \alpha_i},$$
$$\frac{\partial C_{i-1}}{\partial \alpha_i} = 0.$$

8. The method of claim 1, wherein said energy E is minimized subject to a further constraint of one of that said envelope has a minimal arc-length, said envelope has a minimal curvature, or said envelope has a minimal arc-length and curvature.

9. The method of claim 1, wherein said spline segments are initialized by choosing an angle $\alpha_i$ for each ball i that matches a ray orthogonal to a centerline connecting adjacent ball center points.

10. The method of claim 1, further comprising initializing a plurality of connected spline segments $S_i$ that interpolate an inner boundary of said plurality of 2D balls, each said spline segment $S_i$ being parameterized by positions of the $i^{th}$ and $i+1^{th}$ balls and contact angles $\alpha_i, \alpha_{i+1}$ from the center of each respective ball to a point on the perimeter of each said ball contacting said spline segment $S_i$, each said $\alpha_i$ affecting spline segment $S_i$ and $S_{i-1}$:

updating said angles by minimizing an energy E, wherein E is an energy that is a functional of said angles equal to $E=(1-k)E_a+kE_c$, where k is a constant, $E_a$ is an arc-length term and $E_c$ is a curvature term, wherein said updating is repeated until said energy E is minimized subject to a constraint that said inner boundary is tangent to each ball at each point of contact, wherein said inner boundary is represented by said contact angles.

11. The method of claim herein said tubular structure represents a blood vessel.

12. A computer-implemented method for modeling a tubular structure in a digitized image, the method performed by the computer comprising the steps of:

providing a digitized image of a tubular structure, said image comprising a plurality of intensities associated with a 2-dimensional (2D) grid of voxels, said tubular structure containing a plurality of 2D balls of differing radii:

initializing a plurality of connected $C^1$ spline segments $S_i$ that interpolate an inner boundary of said plurality of 2D balls, each said spline segment $S_i$ being parameterized by positions of the $i^{th}$ and $i+1^{th}$ balls and contact angles $\alpha_i, \alpha_{i+1}$ from the center of each respective ball to a point on the perimeter of each said ball contacting said spline segment $S_i$, each said $\alpha_i$ affecting spline segment $S_i$ and $S_{i-1}$; and initializing a plurality of connected $C^1$ spline segments $S_i$ that interpolate an outer boundary of said plurality of 2D balls, each said spline segment $S_i$ being parameterized by positions of the $i^{th}$ and $i+1^{th}$ balls and contact angles $\alpha_i, \alpha_{i+1}$ from the center of each respective ball to a point on the perimeter of each said ball contacting said spline segment $S_i$, each said $\alpha_i$ affecting spline segment $S_i$ and $S_{i-1}$.

13. The method of claim 12, further comprising updating said angles by minimizing an energy E, wherein E is an energy that is a functional of said angles equal to $E=(1-k)E_a+kE_c$, where k is a constant, $E_a$ is an arc-length term and $E_c$ is a curvature term, wherein said updating is repeated until said energy E is minimized subject to constraints that said inner boundary is tangent to each ball at each point of contact, wherein said inner boundary is represented by said contact angles and said outer boundary is tangent to each ball at each point of contact, wherein said outer boundary is represented by said contact angles.

14. A program storage device readable by a computer, tangibly embodying a program of instructions executable by the computer to perform the method steps for modeling a 2-dimensional tubular structure in a digitized image, said method comprising the steps of:

providing a digitized image of a tubular structure, said image comprising a plurality of intensities associated with a 2-dimensional (2D) grid of voxels, said tubular structure containing a plurality of 2D balls of differing radii;

initializing a plurality of connected spline segments $S_i$ that form an envelope surrounding said plurality of 2D balls, each said spline segment $S_i$ being parameterized by positions of the $i^{th}$ and $i+1^{th}$ balls and contact angles $\alpha_i, \alpha_{i+1}$ from the center of each respective ball to a point on the perimeter of each said ball contacting, said spline segment $S_i$, each said $\alpha_i$ affecting spline segment $S_i$ and $S_{i-1}$; and updating said angles by minimizing an energy E, wherein E is an energy that is a functional of said angles equal to $E=(1-k)E_a+kE_c$, where k is a constant, $E_a$ is an arc-length term and $E_c$ is a curvature term, wherein said updating is repeated until said energy E is minimized subject to a constraint that said envelope is tangent to each ball at each point of contact, wherein said envelope is represented by said contact angles.

15. The computer readable program storage device of claim 14, wherein said angles are updated according to $\alpha^{n+1} = \alpha^n - \Delta t \nabla E_{\alpha^n}(\alpha^n)$, wherein $\Delta t$ is a time step, superscript n is a time step index for the angles, and $$\nabla E_{\alpha^n}(\alpha^n) = \left[ \frac{\partial E}{\partial \alpha_1^n}, \ldots, \frac{\partial E}{\partial \alpha_N^n} \right]^T.$$

16. The computer readable program storage device of claim 14, wherein each said spline segment is a $C^1$ cubic spline segment modeled as $S_i = A_i t^3 + B_i t^2 + C_i t + D_i$, wherein $t \in [0,1]$ and wherein each said curve satisfies the constraints $$S_i |_{t=0} = p_i,$$

$$\frac{dS_i}{dt} \bigg|_{t=0} = t_i,$$

$$S_i |_{t=1} = p_{i+1},$$

$$\frac{dS_i}{dt} \bigg|_{t=1} = t_{i+1},$$

wherein $p_i$ is the contact point on the ith ball $$p_i = c_i + \begin{bmatrix} r_i \cos \alpha_i \\ r_i \sin \alpha_i \end{bmatrix}$$

wherein $c_i$ is the center of said ball and $r_i$ is the radius, and $$t_i = \begin{bmatrix} -a_i \sin \alpha_i \\ a_i \cos \alpha_i \end{bmatrix}$$

is the starting direction of said curve, wherein $\alpha_i$ is a stiffness factor.

17. The computer readable program storage device of claim 16, wherein each $\alpha_i$ is fixed to be half the distance between the next and previous ball centers, and wherein for the first and last balls, the $\alpha_i$ is fixed to the distance between the ball center and its neighbor ball center.

18. The computer readable program storage device of claim 16, wherein minimizing said arc-length comprises minimizing $$E_a = \sum_{i=1}^{N} \int |S_i'| dt$$

using derivatives with respect to said angles $\alpha_i$, wherein the prime indicates a derivative with respect to t and the sum is over all said curves, and wherein $$\frac{\partial E_a}{\partial \alpha_i} = \frac{\partial}{\partial \alpha_i} \left( \int |S_{i-1}'| dt \right) + \frac{\partial}{\partial \alpha_i} \left( \int |S_i'| dt \right)$$

$$= \int \langle S_{i-1}', S_{i-1}' \rangle^{-\frac{1}{2}} \left\langle S_{i-1}', \frac{\partial S_{i-1}'}{\partial \alpha_i} \right\rangle dt +$$

$$\int \langle S_i', S_i' \rangle^{-\frac{1}{2}} \left\langle S_i', \frac{\partial S_i'}{\partial \alpha_i} \right\rangle dt.$$

19. The computer readable program storage device of claim 16, wherein minimizing said curvature comprises minimizing $$E_c = \sum_{i=1}^{N} \int \kappa_i^2(t) dt$$

wherein $$\kappa_i = \frac{\langle S_i', JS_i'' \rangle}{\langle S_i', S_i' \rangle^{\frac{3}{2}}} \text{ and } J = \begin{bmatrix} 0 & 1 \\ -1 & 0 \end{bmatrix}$$

using derivatives with respect to said angles $\alpha_i$, wherein the primes indicate derivatives with respect to t and the sum is over all said curves, and wherein $$\frac{\partial E_c}{\partial \alpha_i} = \frac{\partial}{\partial \alpha_i} \left( \int \kappa_{i-1}^2(t) dt \right) + \frac{\partial}{\partial \alpha_i} \left( \int \kappa_i^2(t) dt \right) =$$

$$\frac{\partial}{\partial \alpha_i} \left( \int \left[ \frac{\langle S_{i-1}', JS_{i-1}'' \rangle}{\langle S_{i-1}', S_{i-1}' \rangle^{\frac{3}{2}}} \right]^2 dt \right) + \frac{\partial}{\partial \alpha_i} \left( \int \left[ \frac{\langle S_i', JS_i'' \rangle}{\langle S_i', S_i' \rangle^{\frac{3}{2}}} \right]^2 dt \right) =$$

$$\int 2 \left[ \frac{\langle S_{i-1}', JS_{i-1}'' \rangle}{\langle S_{i-1}', S_{i-1}' \rangle^{\frac{3}{2}}} \right] \left( \frac{\left\langle \frac{\partial S_{i-1}'}{\partial \alpha_i}, JS_{i-1}'' \right\rangle + \left\langle S_{i-1}', J \frac{\partial S_{i-1}''}{\partial \alpha_i} \right\rangle}{\langle S_{i-1}', S_{i-1}' \rangle^{\frac{3}{2}}} - \right.$$

$$\left. \frac{3}{2} \frac{\langle S_{i-1}', JS_{i-1}'' \rangle 2 \left\langle S_{i-1}', \frac{\partial S_{i-1}'}{\partial \alpha_i} \right\rangle}{\langle S_{i-1}', S_{i-1}' \rangle^{\frac{5}{2}}} \right) dt + \int 2 \left[ \frac{\langle S_i', JS_i'' \rangle}{\langle S_i', S_i' \rangle^{\frac{3}{2}}} \right]$$

$$\left( \frac{\left\langle \frac{\partial S_i'}{\partial \alpha_i}, JS_i'' \right\rangle + \left\langle S_i', J \frac{\partial S_i''}{\partial \alpha_i} \right\rangle}{\langle S_i', S_i' \rangle^{\frac{3}{2}}} - \frac{3}{2} \frac{\langle S_i', JS_i'' \rangle 2 \left\langle S_i', \frac{\partial S_i'}{\partial \alpha_i} \right\rangle}{\langle S_i', S_i' \rangle^{\frac{5}{2}}} \right) dt.$$

20. The computer readable program storage device of claim 16, wherein coefficients $A_i$, $B_i$, $C_i$, $D_i$ are defined as $$A_i = -2p_{i+1} + 2p_i + t_i + t_{i+1}$$

$$B_i = 3p_{i+1} - 3p_i - 2t_i - t_{i+1}$$

$$C_i = t_i$$

$$D_i = p_i,$$

and wherein $$\frac{\partial S_i'}{\partial \alpha_i} = 3t^2 \frac{\partial A_i}{\partial \alpha_i} + 2t \frac{\partial B_i}{\partial \alpha_i} + \frac{\partial C_i}{\partial \alpha_i}, \quad \frac{\partial S_{i-1}'}{\partial \alpha_i} = 3t^2 \frac{\partial A_{i-1}}{\partial \alpha_i} + 2t \frac{\partial B_{i-1}}{\partial \alpha_i} + \frac{\partial C_{i-1}}{\partial \alpha_i},$$

$$\frac{\partial S_i''}{\partial \alpha_i} = 6t \frac{\partial A_i}{\partial \alpha_i} + 2 \frac{\partial B_i}{\partial \alpha_i}, \quad \frac{\partial S_{i-1}''}{\partial \alpha_i} = 6t \frac{\partial A_{i-1}}{\partial \alpha_i} + 2 \frac{\partial B_{i-1}}{\partial \alpha_i},$$

$$\frac{\partial A_i}{\partial \alpha_i} = 2 \frac{\partial p_i}{\partial \alpha_i} + \frac{\partial t_i}{\partial \alpha_i}, \quad \frac{\partial A_{i-1}}{\partial \alpha_i} = -2 \frac{\partial p_i}{\partial \alpha_i} + \frac{\partial t_i}{\partial \alpha_i},$$

$$\frac{\partial B_i}{\partial \alpha_i} = -3 \frac{\partial p_i}{\partial \alpha_i} - 2 \frac{\partial t_i}{\partial \alpha_i}, \quad \frac{\partial B_{i-1}}{\partial \alpha_i} = 3 \frac{\partial p_i}{\partial \alpha_i} - \frac{\partial t_i}{\partial \alpha_i},$$

$$\frac{\partial C_i}{\partial \alpha_i} = \frac{\partial t_i}{\partial \alpha_i}, \quad \frac{\partial C_{i-1}}{\partial \alpha_1} = 0.$$

21. The computer readable program storage device of claim 14, wherein said energy E is minimized subject to a further constraint of one of that said envelope has a minimal arc-length, said envelope has a minimal curvature, or said envelope has a minimal arc-length and curvature.

22. The computer readable program storage device of claim 14, wherein said spline segments are initialized by choosing an angle $\alpha_i$ for each ball i that matches a ray orthogonal to a centerline connecting adjacent ball center points.

23. The computer readable program storage device of claim 14, the method further comprising initializing a plurality of connected spline segments $S_i$ that interpolate an inner boundary of said plurality of 2D balls, each said spline segment $S_i$ being parameterized by positions of the $i^{th}$ and $i+1^{th}$ balls and contact angles $\alpha_i$, $\alpha_{i+1}$ from the center of each respective ball to a point on the perimeter of each said ball contacting said spline segment $S_i$, each said $\alpha_i$ affecting spline segment $S_i$ and $S_{i-1}$;

updating said angles by minimizing an energy E, wherein E is an energy that is a functional of said angles equal to $E=(1-k)E_a+kE_c$, where k is a constant, $E_a$ is an arc-length term and $E_c$ is a curvature term, wherein said updating is repeated until said energy E is minimized subject to a constraint that said inner boundary is tangent to each ball at each point of contact, wherein said inner boundary is represented by said contact angles.

24. The computer readable program storage device of claim 14, wherein said tubular structure represents a blood vessel.

\* \* \* \* \*